Patented Feb. 7, 1939

2,146,669

UNITED STATES PATENT OFFICE 2,146,669

ACCELERATOR OF VULCANIZATION

Howard I. Cramer, Cuyahoga Falls, Ohio, assignor to Wingfoot Corporation, Wilmington, Del., a corporation of Delaware No Drawing. Application November 6, 1935, Serial No. 48,546

9 Claims. (Cl. 18—53)

This invention relates to a new group of compounds useful as accelerators for the vulcanization of rubber and to the method of preparing them. It also includes the process of vulcanizing rubber and rubber so vulcanized. More particularly it relates to the imino methylene bis thiol compounds formed by the reaction of a reactive salt of a mercapto aryl thiazole or dithiocarbamic acid with an imino methylene dihalide.

The preparation of these compounds may be represented by the following two equations.

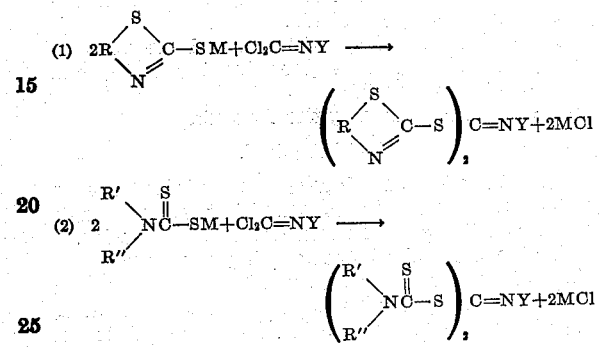

These reactions should be carried out in a dry inert medium such as toluene because the imino methylene dihalides react vigorously with water and alcohol.

In the foregoing equations R may be any arylene group, including substituted arylene groups, R' may be any aliphatic, alicyclic, aryl aralkyl, furfuryl or tetrahydro furfuryl group, R'' may be any aliphatic, aralkyl, alicyclic, furfuryl or tetrahydro furfuryl group, or R' and R'' may be combined to form a cyclic residue, and Y may be any hydrocarbon residue or substituted derivative thereof.

The dithiocarbamates which may be employed in the practice of the invention may also be represented by the formula Z—S—M, wherein Z is a thiocarbamyl radical and M is a reactive radical, such as alkali metal or $NH_4$. Typical dithiocarbamates are those derived from the following amines: dimethyl-, diethyl-, dibutyl-, N-butyl tetrahydrofurfuryl-, N-ethyl benzyl-, di(beta phenyl ethyl)-, di-allyl-, N-ethyl cyclohexyl-, dicyclohexyl-, N-methyl phenyl-, N-methyl hexahydro tolyl-, dibenzyl-, difurfuryl-, N-methyl furfuryl-, and di-tetrahydrofurfuryl amines. Other amines from which dithiocarbamates used in the practice of the invention may be prepared are piperidine and substituted piperidines such as the alpha and beta pipecolines, tetrahydro- and decahydro-quinolines, and morpholine. Although dithiocarbamates derived from secondary amines are preferred, it will be understood that those derived from primary amines, such, for example, as cyclohexyl and butyl amines, may also be reacted with the imino methylene dihalides.

Among the mercapto aryl thiazoles, any of those derived from benzene and naphthalene and their ring substituted derivatives may be used. Illustrative are the mercapto naphthathiazoles, alpha and beta, the mercapto xylyl thiazoles, the mercapto tolyl thiazoles, 4- or 5-nitro 1-mercapto benzothiazole, 4- or 5-chlor 1-mercapto benzothiazole, 3-phenyl 1-mercaptobenzothiazole and other nitro, amino, hydroxy, alkoxy, alkyl and halogen substituted 1-mercapto arylene thiazoles.

Representative of the imino methylene dichlorides are those in which Y of the formula $Cl_2C=NY$ is phenyl, tolyl, nitrophenyl, nitro tolyl, chlorphenyl, ethoxy phenyl, allyl, naphthyl amyl, butyl, benzyl, cyclohexyl, hexahydro tolyl, beta phenethyl, furfuryl, or tetrahydro furfuryl. These compounds may conveniently be prepared by the chlorination at relatively low temperatures of the corresponding iso thio cyanate or mustard oil (Freund and Konig, Ber. 26, 2871, (1893)). While the imino methylene dichlorides are preferred in the practice of the invention, it will be understood that other imino methylene dihalides, such as the dibromides, may be used.

Further illustrative of the invention is phenyl imino methylene bis benzothiazyl sulphide. It may be prepared as follows:

52.2 grams (0.3 mol) of phenyl imino methylene dichloride in 50 cc. of toluene were added dropwise, with good stirring, to a suspension of 113 grams (0.6 mol) of sodium benzothiazyl mercaptide in 700 cc. of toluene at reflux temperature. The heating and stirring were continued for two hours. In order to remove the sodium chloride formed, the reaction mixture was filtered hot. On cooling, the filtrate deposited 82 grams of fine yellow crystals, which melted at 148–150° C., and when recrystallized, at 156–157° C. The yield was 63 percent of theoretical. Analysis of the product showed 10.43% nitrogen and 30.07% sulphur as compared with the calculated values for phenyl imino methylene bis benzothiazyl sulphide of 9.65% and 29.41%, respectively.

When 0.1 mol of phenyl imino methylene dichloride was reacted with 0.2 mol of dry sodium diethyl dithiocarbamate in 200 cc. of dry toluene, a yellow semi-solid material precipitated with the sodium chloride. After cooling, the reaction mixture was filtered. The residue was extracted with absolute alcohol and the extract evaporated. The resulting semi-solid product on crystallization from acetone by addition of petroleum ether gave cream-colored crystals melting at 92–93° C. Analysis of the product showed 9.42% nitrogen and 30.60% sulphur as compared with the calculated values for phenyl imino methylene bis diethyl dithiocarbamate of 10.52% and 32.05%, respectively.

Other illustrative compounds of the invention are o- and p-tolyl imino methylene bis benzothiazyl sulphide, o- and p-phenetidyl imino methylene bis 5-nitro benzothiazyl sulphide, n- and iso-butyl imino methylene bis 3-phenyl benzothiazyl sulphide, cyclohexyl imino methylene bis benzothiazyl sulphide, and benzyl imino methylene bis benzothiazyl sulphide. Others are o- and p-tolyl imino methylene bis dibenzyl dithiocarbamate, o- and p-anisyl imino methylene bis dibutyl dithiocarbamate, amyl imino methylene bis dimethyl dithiocarbamate, alpha furfuryl imino methylene bis diamyl dithiocarbamate, and phenyl imino methylene bis N-ethyl cyclohexyl dithiocarbamate.

The materials of the invention may be employed as accelerators in most of the ordinary rubber compounds. However, the following is one specific formula in which they have been found by trial to yield excellent results.

| | Parts by weight |
|---|---|
| Rubber (extracted pale crepe) | 100 |
| Zinc oxide | 5 |
| Sulphur | 3 |
| Stearic acid | 1.5 |
| Accelerator | 0.5 |

In order to test the efficiency of the compounds of the invention, representative materials have been incorporated into samples of a rubber mix prepared in accordance with the preceding formula. The samples were subjected to vulcanization for various lengths of time and tested. The results of the tests follow.

| Time in mins. at °F. | Ult. tens. in kgs/cm.² | Modulus in kgs/cm.² | | Ult. elong. in percent |
|---|---|---|---|---|
| | | 500% | 700% | |

*Phenyl imino methylene bis diethyl dithiocarbamate*

| 20/260 | 156 | 25 | 104 | 765 |
| 40 | 192 | 36 | 165 | 725 |
| 80 | 204 | 46 | 204 | 700 |

*Phenyl imino methylene bis benzothiazyl sulfide*

| 20/285 | 30 | 8 | 9 | 930 |
| 40 | 105 | 12 | 27 | 925 |
| 60 | 130 | 14 | 37 | 900 |

If it is so desired, the compounds of the invention, particularly the mercapto aryl thiazole derivatives, may be used in conjunction with basic nitrogen-containing accelerators or activators. The following test data show the results obtained by using phenyl imino methylene bis benzothiazyl sulfide in the formula previously given but with the addition of 0.2 part by weight of diphenyl guanidine.

| Time in mins at °F. | Ult. tens. in kgs/cm.² | Modulus in kgs/cm.² | | Ult. elong. in percent |
|---|---|---|---|---|
| | | 500% | 700% | |
| 20/260 | 74 | 10 | 30 | 965 |
| 30 | 157 | 20 | 81 | 805 |
| 45 | 200 | 24 | 142 | 750 |
| 60 | 224 | 45 | 205 | 715 |

From these data it is apparent that the compounds have very good accelerating properties. Other activators which may be used are dibenzylamine, diortho tolyl guanidine, 2-4-diamino diphenyl amine, p-p′diamino diphenyl methane, butyl ammonium oleate, etc.

Although only the preferred form of the invention has been described in detail, it will be apparent to those skilled in the art that the invention is not limited thereto but that various modifications may be made therein without departing from the spirit of the invention or the scope of the appended claims. It is intended that the patent shall cover, by suitable expression in the appended claims, whatever features of patentable novelty reside in the invention.

What I claim is:

1. The method of accelerating the vulcanization of rubber which comprises vulcanizing the rubber in the presence of phenyl imino methylene bis benzothiazyl sulfide.

2. As a new compound, phenyl imino methylene bis benzothiazyl sulfide.

3. A rubber product which has been vulcanized in the presence of phenyl imino methylene bis benzothiazyl sulfide.

4. Compounds having the formula $$(Z-S)_2C=NY,$$

in which Z is an arylthiazyl group of the benzene and naphthalene series and Y is an aromatic radical of the benzene and naphthalene series.

5. The method of accelerating the vulcanization of rubber which comprises vulcanizing the rubber in the presence of a compound having the formula $(Z-S)_2C=NY$, in which Z is an aryl thiazyl group of the benzene and naphthalene series and Y is a hydrocarbon group.

6. As new compounds, substances having the formula $(Z-S)_2C=NY$, in which Z is an aryl thiazyl group of the benzene and naphthalene series and Y is a hydrocarbon group.

7. A rubber product which has been vulcanized in the presence of a material having the formula $(Z-S)_2C=NY$, in which Z is an aryl thiazyl group of the benzene and naphthalene series and Y is a hydrocarbon group.

8. Compounds having the formula $$(Z-S)_2C=NY,$$

in which Z is an aryl thiazyl group of the benzene and naphthalene series and Y is an aryl radical of the benzene and naphthalene series.

9. The process of preparing di(aryl thiazyl thio) methylene imino compounds which comprises reacting an imino dihalide with a reactive salt of a mercapto aryl thiazole in the ratio of approximately one mol of the imino dihalide to two mols of the salt of a mercapto aryl thiazole.

HOWARD I. CRAMER.